United States Patent [19]
Kobayashi et al.

[11] Patent Number: 5,319,915
[45] Date of Patent: Jun. 14, 1994

[54] STEEL CORD FOR REINFORCING RUBBER PRODUCT

[75] Inventors: Yoshiro Kobayashi; Koichi Hinoura; Akihiro Nagamoto; Toshiaki Shimizu; Takanori Kobayashi, all of Hyogo, Japan

[73] Assignee: Tokusen Kogyo Co., Ltd., Hyogo, Japan

[21] Appl. No.: 4,630

[22] Filed: Jan. 14, 1993

Related U.S. Application Data

[63] Continuation of Ser. No. 708,778, May 29, 1991, abandoned.

[30] Foreign Application Priority Data

| Jun. 16, 1990 | [JP] | Japan | 2-158372 |
| Oct. 1, 1990 | [JP] | Japan | 2-102286[U] |
| Jan. 31, 1991 | [JP] | Japan | 3-010805 |

[51] Int. Cl.⁵ .......................... D07B 1/06; D02G 3/48
[52] U.S. Cl. .......................... 57/200; 57/206; 57/311; 57/902; 152/451
[58] Field of Search .............. 57/200, 206, 212, 217, 57/223, 236, 241, 242, 311, 402; 152/451, 527, 556

[56] References Cited

U.S. PATENT DOCUMENTS

| 916,048 | 3/1809 | Smith | 57/145 |
| 2,998,696 | 9/1901 | Payer | 57/206 X |
| 4,020,887 | 5/1977 | Vlasov et al. | 152/359 |

(List continued on next page.)

FOREIGN PATENT DOCUMENTS

| 0143767 | 6/1985 | European Pat. Off. |
| 0175633 | 5/1987 | European Pat. Off. |
| 0225055 | 6/1987 | European Pat. Off. |
| 0237462 | 9/1987 | European Pat. Off. |
| 0387803 | 9/1990 | European Pat. Off. |
| 2473080 | 7/1981 | France | 57/206 |
| 55-90692 | 9/1980 | Japan |
| 59-156805 | 9/1984 | Japan |
| 59-157391 | 9/1984 | Japan |
| 60-21435 | 6/1985 | Japan |
| 61-108397 | 7/1986 | Japan |
| 62-41339 | 2/1987 | Japan |
| 1250482 | 10/1989 | Japan | 57/200 |
| 2-20239 | 6/1990 | Japan |
| WO88/05624 | 8/1988 | PCT Int'l Appl. |
| 9104370 | 4/1991 | PCT Int'l Appl. |
| 1000823 | 8/1965 | United Kingdom |
| 2034363 | 6/1980 | United Kingdom |
| 2081765 | 2/1982 | United Kingdom |
| 2098251 | 11/1982 | United Kingdom |

Primary Examiner—Daniel P. Stodola
Assistant Examiner—William Strynewski
Attorney, Agent, or Firm—Marshall, O'Toole, Gerstein, Murray & Borun

[57] ABSTRACT

A steel cord comprising a number (between 3 and 27) of element steel wires tightly twisted at a regular pitch P between 5 and 20 mm in the same direction. Each wire has a diameter d between 0.1 and 0.4 mm. At least one of the wires includes a spiral portion having a spiral pitch P1 between 0.1P and 0.7P and a spiral diameter d1 between $d+2/100$ mm and $d+2/10$ mm. At least one other wire includes a straight portion. At any cross section of the cord, $\frac{1}{4}$ through $\frac{2}{3}$ of the wires is/are spiral and the other wire/s is/are straight. The stretch of the cord under a load of 5 kg is between 0.10 and 0.40%. A method of producing a steel cord comprises supplying a number of element steel wires, forming at least part of at least one of the wires to be spiral, and tightly twisting the wires. An apparatus for producing a steel cord comprises feeders supported by a frame, each feeding an element steel wire along an axis, a tension device for applying a tension to the wire from at least one of the feeders, a spiral device having pins which extend across and are spaced along an axis, so that at least one of the wires from the tension device turns alternately over and under the pins, a strand device rotatable on the axis, so that the wires are twisted to form a strand, and a take-up device to take up the strand.

4 Claims, 8 Drawing Sheets

U.S. Patent Documents

| | | | |
|---|---|---|---|
| 4,106,957 | 8/1978 | Tournoy | 148/12 B |
| 4,240,486 | 12/1980 | Schmit et al. | 152/330 R |
| 4,258,543 | 3/1981 | Canevari et al. | 57/212 |
| 4,333,306 | 6/1982 | Yamashita et al. | 57/217 X |
| 4,385,486 | 5/1983 | Iwata et al. | 57/10 N |
| 4,399,853 | 8/1983 | Morimoto et al. | 152/359 |
| 4,464,892 | 8/1984 | Kleijwegt | 57/212 |
| 4,506,500 | 3/1985 | Miyauchi et al. | 57/212 X |
| 4,509,318 | 4/1985 | Yoneda | 57/212 |
| 4,516,395 | 5/1985 | Palmer et al. | 57/237 |
| 4,545,190 | 10/1985 | Rye et al. | 57/311 X |
| 4,566,261 | 1/1986 | Brandyberry et al. | 57/212 |
| 4,644,989 | 2/1987 | Charvet et al. | 152/451 |
| 4,737,392 | 4/1988 | Dambre | 428/36 |
| 4,738,096 | 4/1988 | Hatakeyama et al. | 57/206 |
| 4,749,017 | 6/1988 | Loesch | 152/527 |
| 4,836,262 | 6/1989 | Nishizawa et al. | 152/451 |
| 4,850,412 | 7/1989 | Gupta | 152/556 |
| 4,938,015 | 7/1990 | Kinoshita | 57/200 |
| 5,020,312 | 6/1991 | Watakabe | 57/200 |
| 5,109,661 | 5/1992 | Okamoto et al. | 152/451 X |
| 5,118,568 | 6/1992 | Okamoto et al. | 57/200 X |
| 5,162,067 | 11/1992 | Miyawaki | 57/200 X |

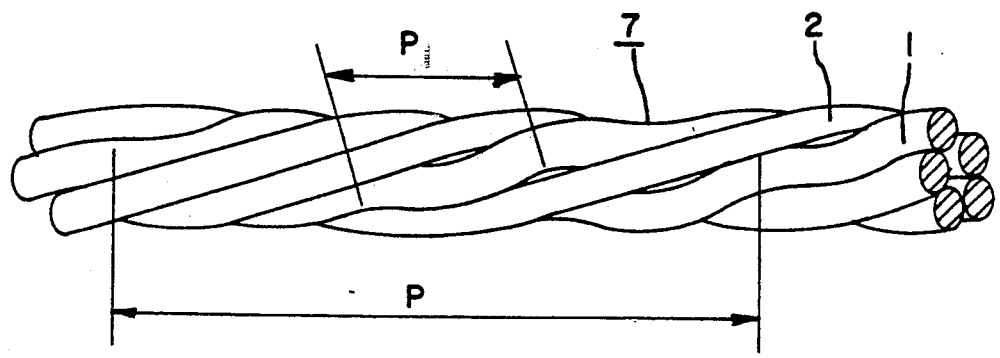
FIG.5
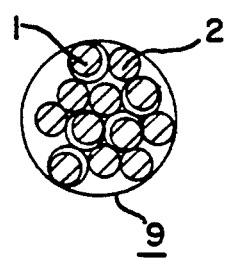
FIG.6a
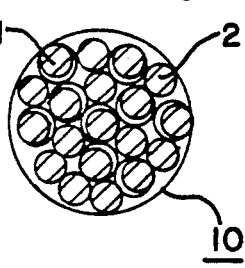
FIG.6b
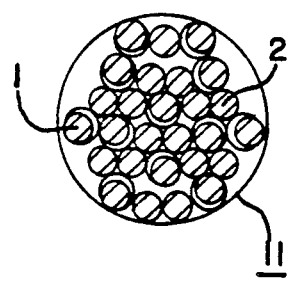
FIG.6c
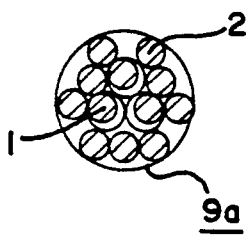
FIG.6d
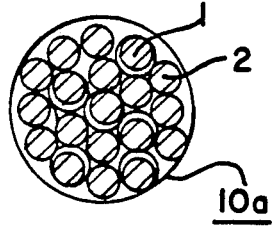
FIG.6e
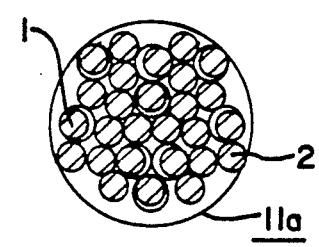
FIG.6f
FIG.7a
FIG.7b
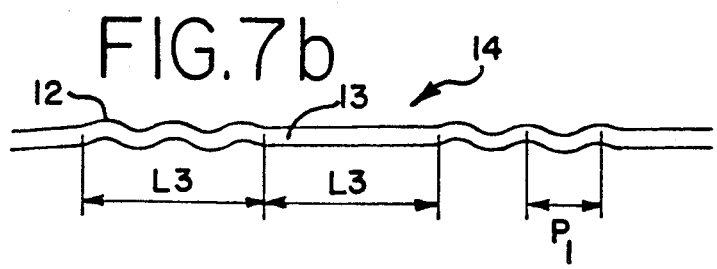

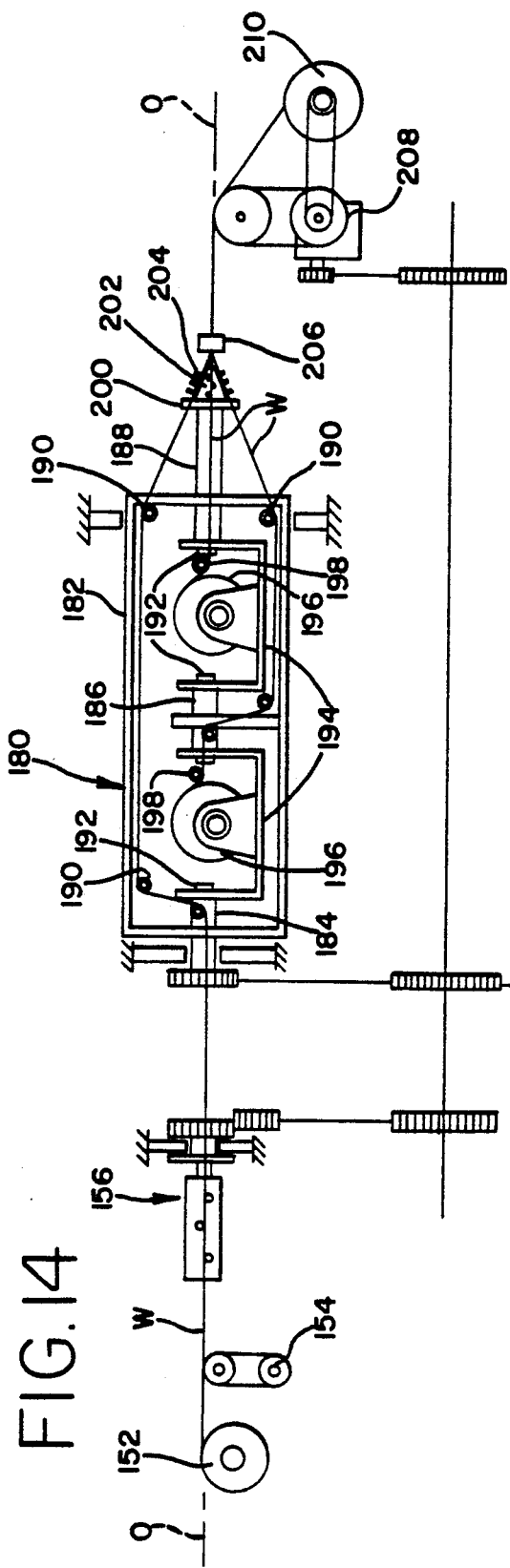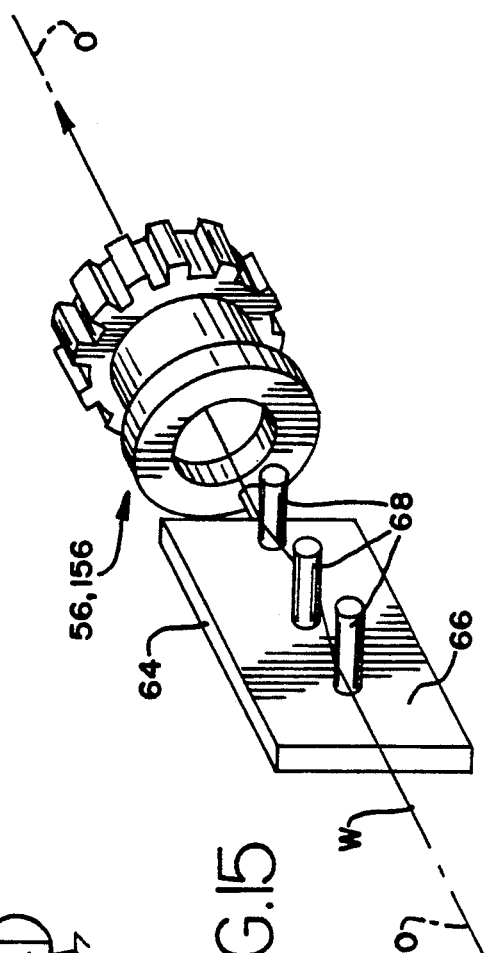

FIG. 16

TABLE I

| SAMPLE CORD NO. | | FIG. NO. | CORD TYPE (NO. OF WIRES) | d (mm) | P (mm) | Ns | d1 (mm) | Pl (mm) | R/S | RCPR (%) | SL (%) | RF | HW |
|---|---|---|---|---|---|---|---|---|---|---|---|---|---|
| 1 | PRIOR ART | 10 | 1 × 3 (3) | 0.28 | 8.0 | 0 | — | — | 1.000 | 0 | 0.18 | 100 | |
| 2 | PRIOR ART | 12 | | | | 0 | — | — | 1.400 | 100 | 0.65 | 105 | |
| 3 | COMPARATIVE | 2 | | | | 1 | 0.32 | 6.5 | 1.066 | 40 | 0.20 | 90 | |
| 4 | INVENTION | 2 | | | | 1 | 0.40 | 3.2 | 1.198 | 90 | 0.22 | 100 | |
| 5 | INVENTION | 4a | | | | 2 | 0.35 | 3.2 | 1.214 | 100 | 0.28 | 95 | |
| 6 | PRIOR ART | — | 1 × 4 (4) | 0.25 | 9.5 | 0 | — | — | 1.000 | 0 | 0.16 | 100 | |
| 7 | PRIOR ART | 3 | | | | 0 | — | — | 1.400 | 100 | 0.63 | 110 | |
| 8 | COMPARATIVE | 4b | | | | 1 | 0.26 | 3.8 | 1.016 | 40 | 0.16 | 90 | |
| 9 | COMPARATIVE | 3 | | | | 2 | 0.50 | 3.8 | 1.642 | 80 | 0.24 | 70 | |
| 10 | INVENTION | 3 | | | | 1 | 0.35 | 3.8 | 1.165 | 90 | 0.18 | 105 | |
| 11 | INVENTION | 4b | | | | 2 | 0.35 | 3.8 | 1.242 | 100 | 0.20 | 105 | |
| 12 | PRIOR ART | — | 1 × 5 (5) | 0.25 | 10.0 | 0 | — | — | 1.000 | 0 | 0.14 | 100 | |
| 13 | PRIOR ART | — | | | | 0 | — | — | 1.400 | 100 | 0.60 | 115 | |
| 14 | COMPARATIVE | 4c,5 | | | | 1 | 0.26 | 4.0 | 1.014 | 35 | 0.14 | 90 | |
| 15 | COMPARATIVE | 4c,5 | | | | 2 | 0.35 | 1.0 | 1.142 | 75 | 0.18 | 70 | |
| 16 | COMPARATIVE | 4c,5 | | | | 2 | 0.35 | 7.0 | 1.138 | 55 | 0.15 | 95 | |
| 17 | INVENTION | 4c,5 | | | | 2 | 0.35 | 4.0 | 1.140 | 100 | 0.16 | 110 | |
| 18 | PRIOR ART | — | 1 × 6 (6) | 0.22 | 12.0 | 0 | — | — | 1.000 | 0 | 0.10 | 100 | |
| 19 | PRIOR ART | — | | | | 0 | — | — | 1.400 | 95 | 0.59 | 110 | |
| 20 | COMPARATIVE | 4d | | | | 1 | 0.32 | 1.0 | 1.158 | 70 | 0.12 | 65 | |
| 21 | COMPARATIVE | 4d | | | | 2 | 0.23 | 4.8 | 1.034 | 45 | 0.12 | 90 | |
| 22 | COMPARATIVE | 4d | | | | 2 | 0.45 | 4.8 | 1.418 | 55 | 0.16 | 80 | |
| 23 | INVENTION | 4d | | | | 2 | 0.32 | 4.8 | 1.167 | 95 | 0.14 | 105 | |

FIG. 17
TABLE 2

| SAMPLE | | | | | | | | | | | | |
|---|---|---|---|---|---|---|---|---|---|---|---|---|
| | CORD No. | FIG. NO. | CORD TYPES (NO. OF WIRES) | d(mm) | P(mm) | Ns | dl (mm) | Pl (mm) | R/S | RCPR (%) | SL (%) | RF | HW |
| PRIOR ART | 1 | 13 | 1×12 | 0.22 | 12.0 | 0 | — | — | 1.000 | 5 | 0.22 | 100 | ○ |
| COMPARATIVE | 2 | 6d | | | | 3 | 0.23 | 4.8 | 1.025 | 45 | 0.24 | 105 | ○ |
| COMPARATIVE | 3 | 6d | (12) | | | 3 | 0.32 | 9.6 | 1.224 | 50 | 0.26 | 110 | ○ |
| INVENTION | 4 | 6d | | | | 3 | 0.26 | 4.8 | 1.098 | 85 | 0.24 | 125 | ○ |
| INVENTION | 5 | 6a | | | | 5 | 0.26 | 4.8 | 1.128 | 100 | 0.26 | 130 | ○ |
| PRIOR ART | 6 | — | 1×19 | 0.20 | 16.0 | 0 | — | — | 1.000 | 0 | 0.24 | 100 | ○ |
| COMPARATIVE | 7 | 6e | | | | 6 | 0.32 | 1.2 | 1.326 | 70 | 0.27 | 95 | △ |
| COMPARATIVE | 8 | — | (19) | | | 19 | 0.32 | 6.4 | 1.600 | 90 | 0.48 | 115 | × |
| INVENTION | 9 | 6e | | | | 6 | 0.32 | 3.6 | 1.304 | 90 | 0.26 | 110 | ○ |
| INVENTION | 10 | 6b | | | | 9 | 0.26 | 6.4 | 1.342 | 100 | 0.28 | 130 | ○ |
| PRIOR ART | 11 | — | 1×27 | 0.175 | 15.5 | 0 | — | — | 1.000 | 0 | 0.26 | 100 | ○ |
| COMPARATIVE | 12 | — | | | | 3 | 0.22 | 6.2 | 1.089 | 40 | 0.26 | 100 | ○ |
| COMPARATIVE | 13 | 6c | (27) | | | 12 | 0.40 | 6.2 | 1.725 | 90 | 0.37 | 110 | △ |
| INVENTION | 14 | 6f | | | | 9 | 0.32 | 6.2 | 1.128 | 95 | 0.28 | 120 | ○ |
| INVENTION | 15 | 6c | | | | 12 | 0.22 | 6.2 | 1.178 | 100 | 0.28 | 130 | ○ |

FIG. 18

TABLE 3

| SAMPLE CORD | | FIG. NO. | CORD TYPE | d (mm) | P (mm) | Ns | dl (mm) | Pl (mm) | L3 (mm) | N3 | R/S | RCPR (%) | SL (%) | RF | HW |
|---|---|---|---|---|---|---|---|---|---|---|---|---|---|---|---|
| PRIOR ART | 1 | 12 | 1×3 | 0.28 | 8.0 | – | – | – | – | 0 | 1.000 | 0 | 0.14 | 100 | ○ |
| | 2 | 14 | " | " | " | – | – | – | – | 0 | 1.400 | 100 | 0.58 | 105 | × |
| COMPARATIVE | 3 | – | " | " | " | – | 0.38 | 1.8 | 8.0 | 0–1 | 1.128 | 35 | 0.14 | 100 | ○ |
| | 4 | 8a | " | " | " | 2 | 0.38 | 6.2 | 8.0 | 1 | 1.196 | 50 | 0.16 | 100 | ○ |
| | 5 | 8a | " | " | " | 2 | 0.38 | 0.6 | 8.0 | 1–2 | 1.212 | 90 | 0.20 | 105 | × |
| | 6 | 8b | " | " | " | 3 | 0.62 | 1.8 | 8.0 | 1 | 1.674 | 100 | 0.40 | 95 | △ |
| INVENTION | 7 | 8a | " | " | " | 2 | 0.30 | 1.8 | 8.0 | 1–2 | 1.082 | 80 | 0.16 | 100 | ○ |
| | 8 | 8a | " | " | " | 2 | 0.38 | 1.8 | 8.0 | 1 | 1.204 | 100 | 0.18 | 105 | ○ |
| | 9 | 8b | " | " | " | 3 | 0.38 | 1.8 | 8.0 | 1–2 | 1.298 | 100 | 0.24 | 110 | ○ |

STEEL CORD FOR REINFORCING RUBBER PRODUCT

This is a continuation of U.S. application Ser. No. 07/708,778, filed May 29, 1991, now abandoned.

FIELD AND BACKGROUND OF THE INVENTION

The present invention relates to steel cords used as reinforcements for rubber products such as automobile tires and conveyor belts.

Generally, a steel cord of this type is formed by twisting a number of element wires or strands, and a reinforcement includes a number of such cords extending in parallel and coated with rubber. The cord is required to be mechanically strong and chemically adherent to the rubber. The cord should also enable the fluid rubber compound to flow between the wires during manufacture and fill the cavities or spaces among them, so that the wires and rubber form a solid cord.

FIGS. 10 and 11 of the accompanying drawings show two types of conventional steel cords 27 and 28 of "1×n" closed strands, "n" being the number of wires. The cord 27 has a single ply of twisted wires 29 (n=3 through 6) for pneumatic radial tires for automobiles. The cord 28 has a bundle of twisted wires 29 (n=7 through 27) for pneumatic radial tires for heavy loads such as for trucks and buses.

The wires 29 are tightly or closely twisted and form a center cavity H (FIG. 10) or cavities H (FIG. 11) among them. When a complex sheet is formed of steel cords and two rubber sheets, the rubber compound is prevented from flowing into the cavity or cavities H, and merely surrounds the outside of the cord. This prevents a complete complex of steel cords and rubber from being formed. Accordingly, in an automobile tire, for example, containing such cords 27 or 28, there is poor adhesion between the cords and rubber, and when the car is driven, the cords and the rubber may separate. This degrades the tire function, and allows water contained in the rubber or penetrating through cracks in the tire to enter the cavity/cavities H. The water may then flow along the cords and corrode them, with the result that they may become mechanically weakened.

In the cord 28 (FIG. 11), the outer and inner wires are twisted in different spirals. When repeated bending stresses are applied on the cord, the inner wires may project between the outer wires, so that the cord may be fatigued.

FIG. 12 shows a conventional open-strand steel cord 30, which is formed by twisting three wires 29 loosely with clearances I between them (see Japanese patent early publication S.55-90692). In order for the rubber compound to sufficiently flow into the inside of the cord between the wires, the clearances I are required to be 0.01 mm or larger. However, the larger clearances result in the following problems.

The free space where the wires 29 can move is enlarged, so that they may deflect and the strand may not be uniform longitudinally. This may cause the cord to buckle when it is loaded with repeated bending stresses.

Because the cord stretches or elongates greatly under very low load, its handling workability is low.

In addition, the tension under very low load applied to the cord when a complex sheet is formed reduces the clearances I, so that the rubber compound may not flow sufficiently into the inside of the cord.

SUMMARY OF THE INVENTION

It is an object of the invention to provide an improved steel cord for reinforcing a rubber product. The stretch of the cord is small under very low load, has a stable strand, may not easily buckle, is less fatigued under repeated bending stresses, and can form a complete complex with rubber.

It is another object to provide a method and an apparatus for producing such a cord in one process at a low cost.

A steel cord according to the invention comprises a number (between 3 and 27) of element steel wires tightly twisted at a regular pitch P between 5 and 20 mm in the same direction. Each wire has a diameter d between 0.1 and 0.4 mm. At least one of the wires includes a spiral portion having a spiral pitch $P_1$ between $0.1P$ and $0.7P$ and a spiral diameter $d_1$ between $d+2/100$ mm and $d+2/10$ mm. At least one other wire includes a straight portion. At any cross section of the cord, $\frac{1}{4}$ through $\frac{2}{3}$ of the wires is/are spiral and the other wire/s is/are straight. The stretch of the cord under a load of 5 kg is between 0.10 and 0.40%. These numerical limitations resulted from a number of experiments.

If the twist pitch P is too small, the cord is weak and the productivity is low. If P is excessive, the strand is not stable and the cord is inferior in its handling workability and resistance to fatigue.

If the spiral pitch $P_1$ is smaller than $0.1P$, the cord stretch under very low load is large and, because the formation of a wire to form a spiral requires an excessive plastic deformation, the wire may be easily broken. If $P_1$ exceeds $0.7p$, the tension due to the flow of rubber compound when forming a rubber product, or the ironing force on the cord surface reduces the clearances between the wires, so that the compound does not sufficiently penetrate into the cord.

If the wire diameter d is smaller than 0.1 mm, the cord is mechanically weak. If d exceeds 0.4 mm, the cord diameter is too large and the cord is not flexible.

If the spiral diameter $d_1$ is smaller than $d+2/100$ mm, the rubber compound, even if highly flowable, does not sufficiently penetrate when pressurizing and vulcanizing a rubber product. If $d_1$ exceeds $d+2/10$ mm, the strand is not stable, the resistance to fatigue is low, the cord stretch under very low load is large, and the workability is low.

If the spiral wire portions at any cross section of the cord are fewer than $\frac{1}{4}$ of the total wires, the rubber compound does not sufficiently penetrate. If they exceed $\frac{2}{3}$, the cord stretch under very low load and the cord diameter are large.

If the cord stretch under 5 kg load is excessive, the workability is low when forming a cord and a rubber product. In addition, the tension and bending stress on the cord reduce the clearances between the wires. This stretch should be a minimum, but is rarely less than 0.10% by the nature of a steel cord.

A method of producing a steel cord according to the invention comprises supplying a number of element steel wires, forming at least part of at least one of the wires to be spiral, and tightly twisting the wires.

An apparatus for producing a steel cord according to the invention comprises a frame, feeders supported by the frame, each feeding an element steel wire along an axis, tension means supported by the frame for applying a tension to the wire from at least one of the feeders, spiral means supported by the frame and adapted to be rotated on the axis, the spiral means having pins which extend across and are spaced along the axis, so that at least one of the wires from the tension means turns alternately over and under the pins, strand means supported by the frame and adapted to be rotated on the axis, so that the wires from the spiral means and the other feeders are twisted to form a strand, and take-up means supported by the frame and adapted to take up the strand.

BRIEF DESCRIPTION OF THE DRAWINGS

The invention will be better understood from the following detailed description taken in conjunction with the figures of the accompanying drawings, wherein:

FIG. 5 is a schematic side view of the cord of FIG. 4c;

FIGS. 6a-6f are schematic views in cross section of other types of steel cords according to the invention;

FIGS. 7a and 7b are views similar to FIGS. 1a and 1b, but showing another element steel wire according to the invention;

FIGS. 13 and 14 are schematic views of two types of machines according to the invention;

FIG. 15 is an enlarged perspective view of a spiral former of the machines shown in FIGS. 13-14; and FIGS. 16, 17 and 18 show three tables which further explain the invention.

DETAILED DESCRIPTION OF THE INVENTION

Figure 1A:
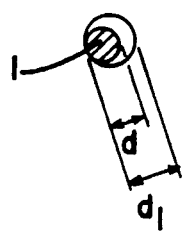
FIGS. 1a and 1b are a schematic view in cross section and a schematic side view, respectively, of a spiral element steel wire according to the invention.
Figure 1B:
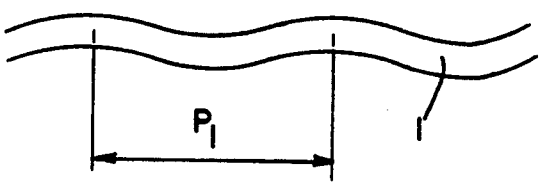

FIGS. 1a-1b show a spiral element wire 1 made, in this specific example, of brass-plated hard steel and having a wire diameter d, a spiral or apparent diameter d1 when viewed from the end, and a spiral pitch P1.

FIGS. 2-5 show steel cords 3-8 formed of one or more spiral element wire/s 1 and one or more straight element wire/s 2 tightly twisted or intertwined at a regular pitch P. Each straight wire 2 is also made of brass-plated hard steel and has the same diameter d.

Table 1 (FIG. 16) attached hereto shows types, experimental results etc. of cord samples according to the invention and comparative samples, as shown in FIGS. 2-5, and prior art samples. The following is a discussion of the symbols and abbreviations contained in Table 1.

The comparative samples differ from the samples of the invention in at least one of number Ns of spiral wires 1, spiral pitch P1 and spiral diameter d1.

The diameter R (FIGS. 2, 3) is an average of the outer diameters of each sample, which were measured by a JIS B7502 micrometer at three longitudinal points at intervals about 100 mm.

S (FIGS. 2, 3) represents the outer diameter, measured by the same micrometer, of a cord formed by tightly twisting the same number of straight wires only, each having the same diameter, as each sample.

RCPR: Rubber Compound Penetration Ratio

Each cord under 5 kg of tensile load was embedded in rubber compound having 35 kg/cm$^2$ of 100% modulus. After vulcanizing the rubber, the cord was taken out and disassembled into wires. A certain length L1 of the disassembled cord was observed, and the length L2 which bore traces of contact with the rubber was measured. The percentage of L2 to L1 represents the rubber compound penetration ratio. This value should be 60% or higher.

SL: Stretch under 5 kg Load

The value SL is a percentage of stretch of each sample under 5 kg of load, and should be 0.40% or lower in view of cord workability and strand stability.

RF: Resistance to Fatigue

Steel cords for each sample were embedded in a sheet of rubber compound having 35 kg/cm$^2$ of 100% modulus. The resultant sheet was tested by a three-point pulley bending fatigue tester, which determined the frequency of cycles of fretting wear, buckling etc. until the cord broke. When the indexes for the frequencies for the prior art samples of closed strand were 100, those for the other samples having the same number of wires represented the resistance to fatigue.

HW: Handling Workability

HW represents the difficulty in handling and working the cords when they are produced and the complex sheets are formed. In comparison with the prior art samples of closed strand, the symbols ×, ∆ and ○ mean much more difficulty, more difficulty and substantially the same, respectively.

As shown in Table 1, prior art cord Nos. 1, 6, 12 and 18 of closed strands lack RCPR. Prior art cord Nos. 2, 7, 13 and 19 of open strands are high in RCPR and RF, but large in SL and low in HW.

Comparative cord Nos. 3, 8, 9, 14–16 and 20–22 are inferior in terms of at least one of RCPR, SL, RF and HW.

Cord Nos. 4, 5, 10, 11, 17 and 23 according to this invention satisfy all the four terms and are optimum as reinforcements for rubber products.

FIGS. 6a-6f show steel cords 9–11 and 9a–11a formed by tightly twisting some spiral wires 1 and some straight wires 2, in such a manner that at least one spiral wire 1 contact each straight wire 2.

Table 2 (FIG. 17) attached hereto is similar to Table 1, but showing data of samples of the invention and comparative samples as shown in FIGS. 6a-6f and prior art samples.

In the samples of the invention, not only did the rubber compound sufficiently penetrate into the cords, as shown in Table 2, but it was able to completely surround the wires. This considerably reduces the fretting wear caused by the contact between the wires, and improves the RF.

Prior art cord Nos. 1, 6 and 11 in Table 2 of closed bundle strand lack RCPR. Comparative cord Nos. 2, 3, 7, 8, 12 and 13 in Table 2 are inferior in at least one of the four terms. Cord Nos. 4, 5, 9, 10, 14 and 15 of the invention in Table 2 satisfy all the terms.

FIGS. 7a and 7b show another form of element wire 14 of brass-plated hard steel having a diameter d. The wire 14 alternately has a spiral portion 12 and a straight portion 13, each having a length L3. The spiral portion 12 has a spiral pitch P1.

FIGS. 8a–8d show steel cords 15, 15a, 16 and 17 formed of two or more such wires 14 and one or more straight wire/s 2 tightly intertwined at a regular pitch P.

In FIGS. 8a–8d, the spiral portions 12 of each wire 14 are displaced longitudinally from the spiral portions 12 of one or more other wires 14, so that any cross section of the cord contains at least one spiral wire portion 12.

Table 3 (FIG. 18) is similar to Tables 1 and 2, but shows data of samples of the invention and comparative samples, as shown in FIGS. 8a–d, and prior art samples. N3 is the number of spiral wire portions 12 appearing in any cross section of the cord.

Prior art cord Nos. 1 and 2 in Table 3 are substantially the same as cord Nos. 1 and 2 in Table 1. Comparative cord Nos. 3–6 in Table 3 are inferior in at least one of RCPR, RF and HW. Cord Nos. 7–9 of the invention in Table 3 satisfy all the four terms.

Figure 8A:
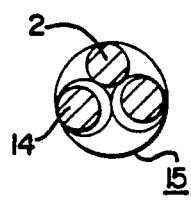
FIGS. 8a-8d and 9 are schematic views in cross section of further types of steel cords according to the invention.
Figure 8C:
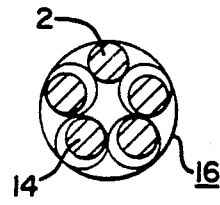
Figure 8D:
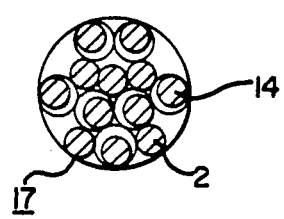

With respect to samples according to FIGS. 8c and 8d, not shown in Table 3, similar results were obtained.

It is possible to form a multi-strand steel cord, as a stronger reinforcement, by twisting some strands each being one of the cords of the embodiments of the invention. In this case, the number of strands should be 3–7 and each strand should have 3–7 wires to maintain the strand stability and prevent the cord diameter from increasing extremely.

In each embodiment, the cord diameter R should range from 1.01S to 1.50S, and more preferably to 1.30S. If R is too small, rubber compound does not sufficiently penetrate into the cord. If R is excessive, it is necessary to thicken the compound. This is not economical and increases the weight of rubber product.

Figure 9:
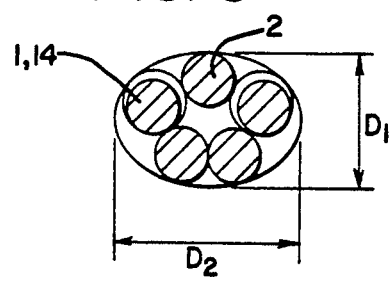
Figure 8B:
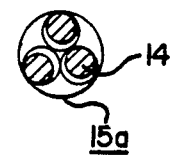
Figure 10:
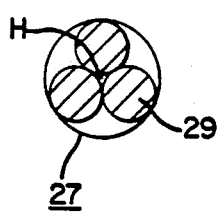
FIGS. 10-12 are schematic views in cross section of prior art steel cords.
Figure 11:
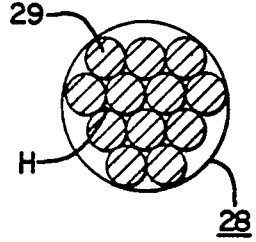
Figure 12:
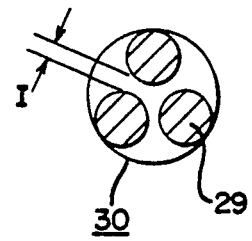

FIG. 9 shows an elliptical steel cord having a minimum diameter D1 and a maximum diameter D2, and formed of three straight wires 1 and two spiral wires 14. The ratio D1/D2 should range from 0.6 to 0.9. By orienting the minimum diameter D1 across a rubber sheet, the sheet can be thinned and the resistance to fatigue can be improved.

The steel cords of the invention have passages along their entire length for rubber compound to penetrate into the cords, have stable strands, do not greatly stretch under very low load, and are very workable when forming a complex sheet.

When the cords are coated with rubber compound, it substantially completely surrounds each wire to prevent the cords from corroding and the cords and compound from separating.

The cords do not easily buckle under repeated bonding stresses, and their resistance to fatigue is improved.

When the cords are reeled, the reels avoid puncture, which might occur if the cords stretched greatly under very low load.

For example, a tire having steel cords of the invention contained in at least one of a belt, a carcass and a chafer, has a high performance and a long life. The tire improves the safety of the car and can reduce the fuel consumption.

Figure 2:
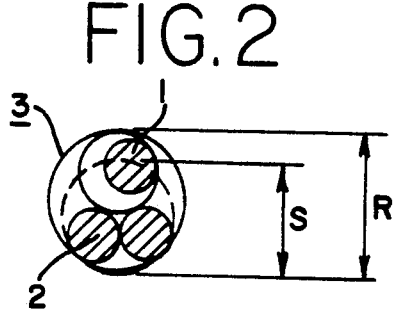
FIGS. 2, 3 and 4a-4d are schematic views in cross section of various types of steel cords according to the invention.
Figure 3:
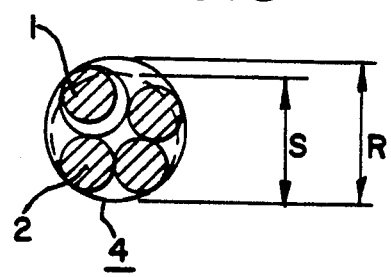
Figure 4A:
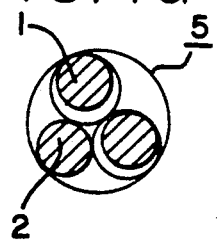
Figure 4B:
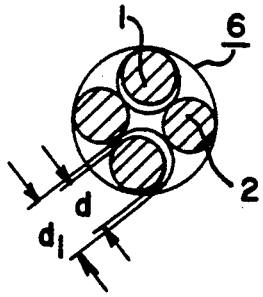
Figure 4C:
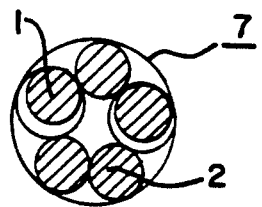
Figure 4D:
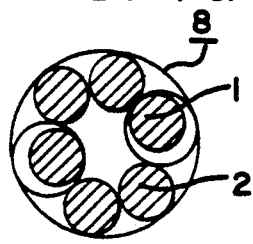
Figure 13:
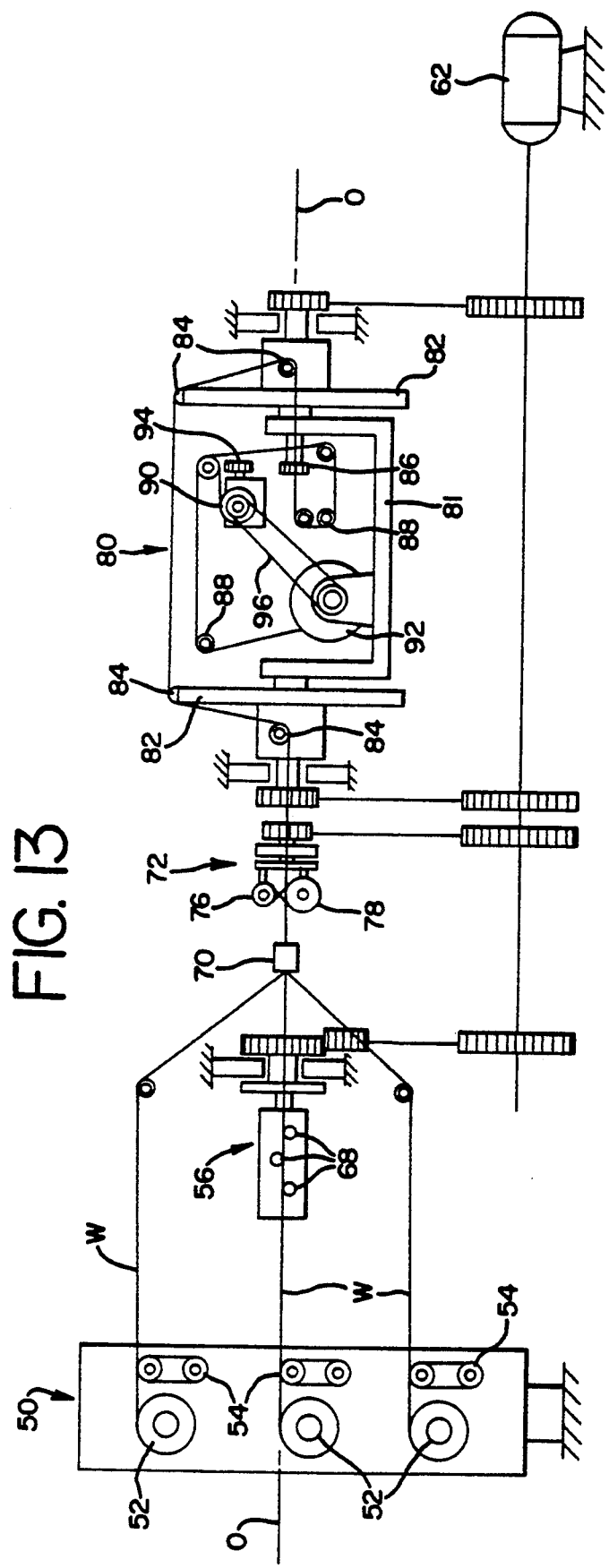

FIG. 13 shows an apparatus of the double-twist type for forming a steel cord as shown in FIG. 2.

A conventional wire feeder 50 is fixed to a frame, and includes three sets of reels 52 and dancer rollers 54. Each, reel 52 is braked and each roller 54 is biased upwardly to apply tension to an element steel wire W, which has a diameter of 0.28 mm.

A spiral former 56 is supported on an axis 0, and connected through a gear system to an electric motor 62, so as to rotate in one direction at 15,000 rpm.

As best shown in FIG. 15, the former 56 includes a rectangular plate 64 which is displaced from the axis 0 and has a surface 66 extending in parallel to the axis.

Three sintered hard alloy pins 68 are fixed to the surface 66 at a regular interval, and extend across the axis 0. Both end pins extend through the axis 0, and the center pin is displaced from it a distance which is substantially shorter than the 1 mm diameter of the three pins.

The wire from the center reel 52 passes through the rotating former 56 along the axis 0, but turns alternately over and under the pins 68, so as to be spiral as shown in FIG. 1b.

A gatherer 70 fixed on the axis 0 gathers the spiral wire and the two straight wires from the other reels 52.

A conventional twister 72 is supported on the axis 0 to be rotated at 12,000 rpm in the direction opposite to the spiral former 56.

The twister 72 includes two overtwist rollers 76 and 78 supported on parallel axes, which extend perpendicularly to and diametrically of the axis 0. The smaller roller 76 has one peripheral groove and the larger roller 78 has two peripheral grooves.

The gathered wires pass first around one groove of the larger roller 78, then around the groove of the smaller roller 76, and finally around the other groove of the larger roller. The rotation of twister 72 provisionally twists the wires at the inlet of gatherer 70 and forms a primary strand of the wires.

A conventional buncher type strander 80 includes two circular end flyers 82 supported on the axis 0 by the frame. Each flyer 82 has two turn rollers 84. To the downstream flyer 82 is fixed an inner gear 86 on the axis 0.

A cradle 81 is supported at its top by the flyers 82 and is rotatable relative to it, and supports rollers 88, a capstan 90 and a bobbin 92. The capstan 90 has a gear 94 connected to the gear 86. The bobbin 92 is connected to the capstan 90 by a belt 96.

The flyers 82 are rotated at 5,000 rpm in the same direction as the twister 72, but the cradle 81 does not rotate by gravity, so as to form a final strand as a steel cord from the primary strand. The cord is taken up at a regular speed by the capstan 90 and wound up by the reel 92.

The wire spiral diameter d1 and pitch P1 can be changed by selecting the rotational speed of former 56 and the interval between the former pins 68. The strand twist pitch P likewise changes with the rotational speeds of strander 80 and capstan 90.

FIG. 14 shows another apparatus for forming a steel cord as shown in FIG. 2. This apparatus includes a braked reel 152, a dancer roller 154 and a spiral former 156, which are similar to the components 52, 54 and 56 in FIGS. 13 and 15.

A conventional strander 180 includes a tubular body 182 supported by a frame coaxially with the former 156 on an axis 0. To the body 182 are fixed three hollow shafts 184, 186 and 188 coaxially. The rear shaft 184 is connected to a motor 162 to be rotated in the direction opposite to the former 156. The body 182 has six turn rollers 190.

The hollow shafts 184, 186 and 188 each rotatably support a coaxial pin 192 thereinside. The three pins 192 are fixed to two cradles 194 within the body 182. Each cradle 194 supports a braked feeder reel 196 and a dancer roller 198.

To the front hollow shaft 188 is fixed, adjacent its front end, a guide disc 200 having three peripheral recesses to guide the wires from the former 156 and reels 196.

The front end of shaft 188 has a conical head 202. Three rows of cone pins 204 extend perpendicularly to the conical head surface. Each row of pins 204 are arranged similarly to the former pins 68 of FIG. 15.

When the tubular body 182 rotates, the cradles 196 do not move by gravity. The wires are twisted at a gatherer 206 to form a strand, which is taken up by a capstan 208 and a bobbin 210.

The twister 72 (FIG. 13) and cone pins 204 (FIG. 14) are provided to obtain a secure strand twist and to prevent the strand from flaring back, and to give the wire a precisely spiral form depending on the twist pitch. The twister 72 and pins 204 may be eliminated.

The twister 72 may otherwise be provided immediately after the spiral former 56 to give the wire a more precisely spiral form.

The formers 56 and 156 may be adapted to rotate periodically to form a wire as shown in FIG. 7.

Immediately before the bobbin 92 (FIG. 13) or 210 (FIG. 14), may be provided rollers or a mold having an elliptical hole for shaping the cord to be elliptical as shown in FIG. 9.

We claim:

1. A steel cord for reinforcing rubber, which comprises a number between 3 and 27 of wires twisted at a regular pitch P between 5 and 20 mm in the same direction, each of said wires having a diameter d between 0.1 and 0.4 mm, a number between $\frac{1}{4}$ and $\frac{2}{3}$ of the total number of said wires, each having a preformed lengthwise spiral form in small curl at a pitch between $0.1P$ and $0.7P$, the spiral diameter being between $d+2/100$ and $d+2/10$ mm, such that the spiral wires repeatedly contact at intermittent points and are spaced from adjacent wires at locations between said intermittent points.

2. The cord of claim 1, having a diameter between $1.01S$ and $1.50S$, wherein a steel cord formed entirely of straight wires, each wire having the same diameter, has an overall diameter and S represents said overall diameter.

3. The cord of claim 1, comprising 3 through 7 twisted strands, each strand consisting of the cord of claim 1, wherein the number n of wires is 3 through 7.

4. A cord of claim 1, wherein the stretch of said cord under a load of 5 kg is between 0.10 and 0.40%.

* * * * *